United States Patent [19]

Yaginuma

[11] Patent Number: 5,430,778
[45] Date of Patent: Jul. 4, 1995

[54] METHOD FOR MEASURING FUEL ROD POSITIONS AND APPARATUS THEREFOR

[75] Inventor: Yoshitaka Yaginuma, Naka, Japan

[73] Assignee: Mitsubishi Nuclear Fuel Co., Tokyo, Japan

[21] Appl. No.: 208,957

[22] Filed: Mar. 11, 1994

[30] Foreign Application Priority Data

Mar. 12, 1993 [JP] Japan ................. 5-052721

[51] Int. Cl.$^6$ .............................................. G21C 17/00
[52] U.S. Cl. .................................... 376/258; 376/248
[58] Field of Search ............... 376/245, 248, 252, 258; 33/502

[56] References Cited

U.S. PATENT DOCUMENTS

| | | | |
|---|---|---|---|
| 4,464,332 | 8/1984 | Boisseuil et al. | 376/248 |
| 4,645,634 | 2/1987 | Roseveare | 376/258 |
| 4,728,483 | 3/1988 | Ahmed et al. | 376/258 |
| 4,777,011 | 10/1988 | Scharpenberg | 376/245 |
| 4,816,207 | 3/1989 | Scharpenberg | 376/252 |
| 4,847,037 | 7/1989 | Scharpenberg et al. | 376/258 |

FOREIGN PATENT DOCUMENTS

| | | |
|---|---|---|
| 0053066 | 6/1982 | European Pat. Off. . |
| 0147037 | 7/1985 | European Pat. Off. . |
| 0224100 | 6/1987 | European Pat. Off. . |
| 0224101 | 6/1987 | European Pat. Off. . |

OTHER PUBLICATIONS

Patent Abstracts of Japan, vol. 13, No. 104, Mar. 13, 1989, P-A-63 284 494, Nov. 21, 1988.
Patent Abstracts of Japan, vol. 17, No. 320, Jun. 17, 1993, JP-A-05 034 490, Feb. 9, 1993.
Patent Abstracts of Japan, vol. 16, No. 218, May 21, 1992, JP-A-04 042 002, Feb. 12, 1992.

Primary Examiner—Daniel D. Wasil
Attorney, Agent, or Firm—Oblon, Spivak, McClelland, Maier & Neustadt

[57] ABSTRACT

A fuel rod position determination apparatus and a method are presented to enable efficient and accurate determination of the positions of the fuel rods in a fuel assembly in which it is not possible to insert a measuring instrument in a straight line through the fuel assembly. The apparatus first measures the positions of the peripheral fuel rods from the outside of the fuel assembly. This operation is continued by inserting sensors into the assembly through the spaces between the fuel rods so as to measure the profiles of the fuel rods. The positions of all the fuel rods including the interior fuel rods are determined on the basis of the profile data, the reference data formed by the peripheral fuel rods, and the known diameter data of the fuel rods.

19 Claims, 5 Drawing Sheets

METHOD FOR MEASURING FUEL ROD POSITIONS AND APPARATUS THEREFOR

BACKGROUND OF THE INVENTION

1. Field of the Invention

The present invention relates to a method of measuring the positions of a plurality of fuel rods spaced apart from each other in a fuel assembly, and an apparatus for performing such measurements.

2. Technical Background

A conventional type of fuel assembly such as the one shown in FIG. 11 comprises: an upper nozzle 1; a lower nozzle 2 which is oppositely spaced apart from the upper nozzle 1; a plurality of support grids 3, having grid cells formed by straps, disposed at a predetermined interval between the upper nozzle 1 and the lower nozzle 2; control rod guide pipes 4 which are inserted through the grid cells and attached to the support grids 3, to the upper nozzle 1 and to the lower nozzle 2; and a plurality of fuel rods 5 which are inserted into the grid cells of the support grids 3, and elastically held by the springs formed inside the support grids 3. The spacing between the fuel rods 5 in this type of fuel assembly is measured by inserting a strain gage type probe between the fuel rods 5, and the contact force on the probe is taken as a measure of the spacing.

In the conventional type of fuel assembly shown in FIG. 11, the size of the opening of the grid cells for inserting the fuel rods 5 is the same as that for inserting the guide pipes 4, thus making it possible to use the technique of inserting the probe between the fuel rods 5 to measure their spacing. However, in the other type of fuel assembly shown in FIG. 2, in which the guide pipes 10 occupy the space equivalent to four fuel rods, there are regions of the fuel rods where the strain gage type probe becomes impossible to be inserted because of the interference presented by the guide pipes 10.

SUMMARY OF THE INVENTION

The present invention presents a method and an apparatus for efficiently and accurately determining the positions of the fuel rods in a fuel assembly having such a structure that a conventional strain gage type of instrument cannot be used.

The method of the present invention comprises the steps of: determining the positions of the peripheral fuel rods disposed on the peripheries of said fuel assembly from the outside of said fuel assembly; inserting sensors in the spaces between fuel rods so as to measure the profiles of the fuel rods; computing the positions of each of said plurality of fuel rods on the basis of the profiles of the fuel rods measured, the positions of the peripheral fuel rods and the diameter of the fuel rods.

The apparatus of the present invention comprises: a peripheral fuel rods position determination means, disposed so as to be movable along the peripheries of said fuel assembly and in a plane perpendicular to the axis of the fuel rods, for determining the positions of the fuel rods disposed on the peripheries of said fuel assembly; an operating means disposed on said peripheral fuel rod position determination means for moving the peripheral fuel rod position determination means; interior fuel rod position determination means disposed so as to enable insertion and removal between fuel rods for determining the positions of the fuel rods disposed in the interior of said fuel assembly with reference to the positions of the peripheral fuel rods; probe driving means disposed on said interior fuel rod position determination means for driving said interior fuel rod position determination means.

According to the method and the apparatus of the present invention, the measurements of the positions of the peripheral fuel rods and the diameter of the fuel rods are used to determine the positions of the peripheral fuel rods, and using the positional data for the peripheral fuel rods and the profile measurements of the interior fuel rods, produced from the sensors inserted through the spaces between the fuel rods, combined with the diameter data are used to compute the positions of the interior fuel rods, successively from the peripheral fuel rods.

Therefore, the present invention enables to determine the position of all the fuel rods efficiently and accurately in a fuel assembly in which a conventional strain gage type instrument is not possible to be used because of the configuration of the fuel assembly.

PREFERRED EMBODIMENT

In the following, an embodiment of the present invention will be described with reference to the drawings presented in FIGS. 1 to 10.

Figure 1:
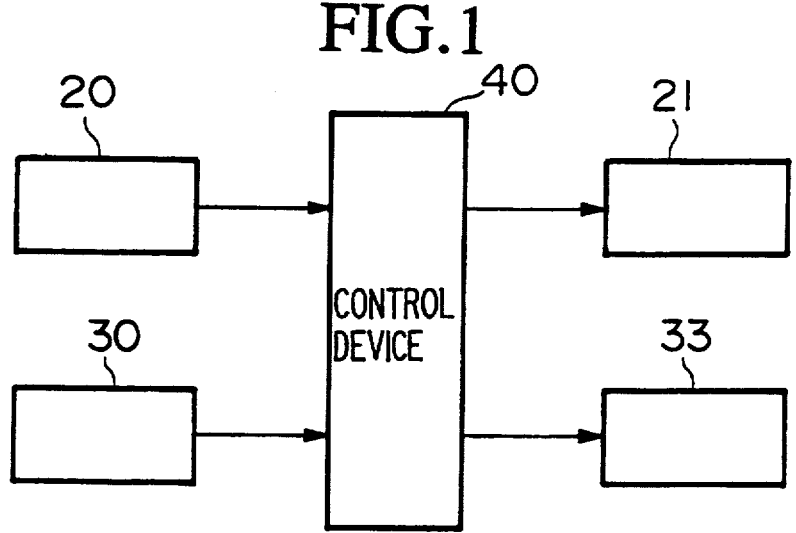
FIG. 1 is a block diagram of the essential components in an embodiment of the present invention.
Figure 2:
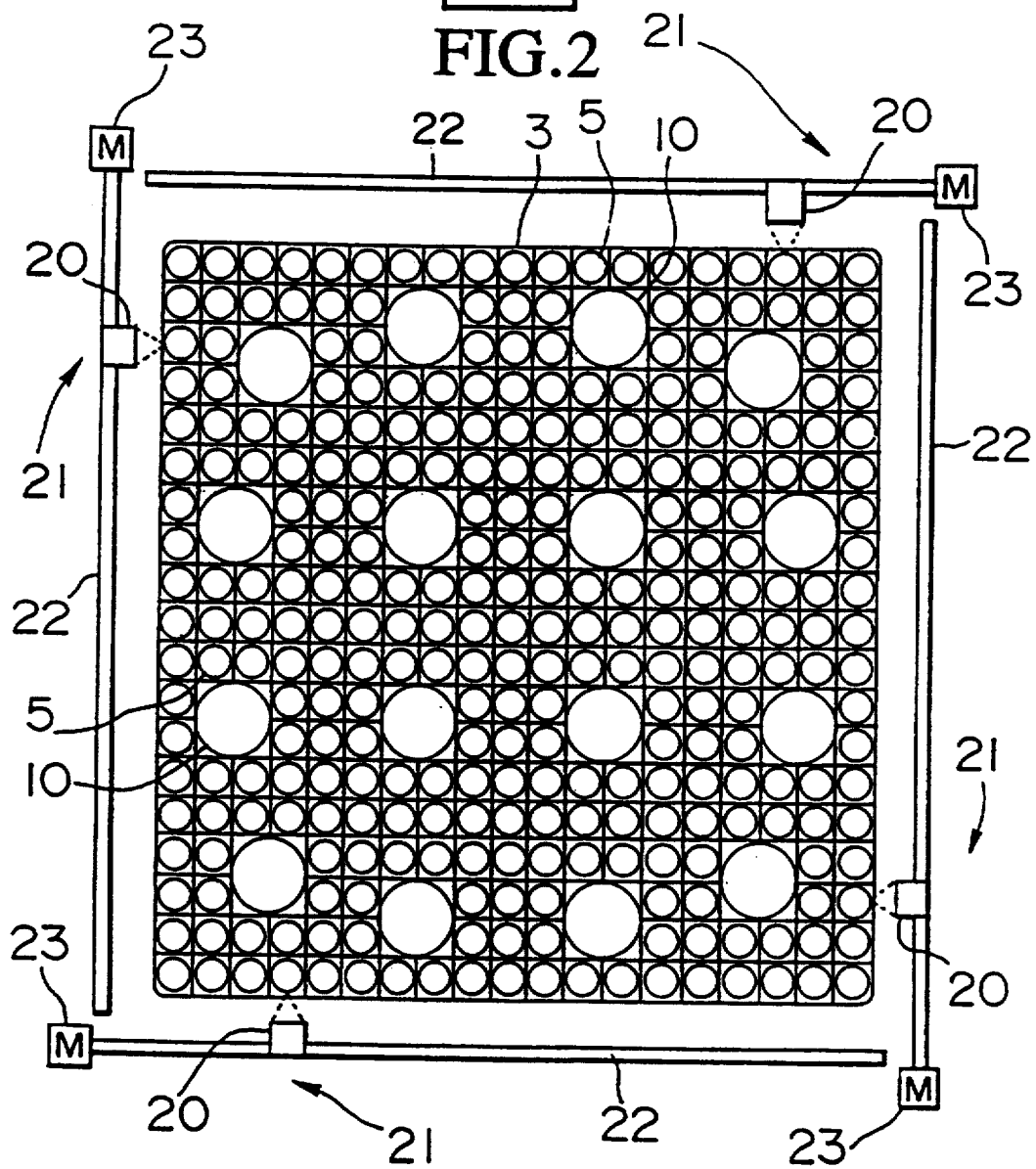
FIG. 2 is a plan view of an example of the apparatus for measuring the positions of the peripheral fuel rods disposed in the peripheries of the fuel assembly.
Figure 3:
FIG. 3 is an illustration of an example of the output data from a reflection type laser displacement meter.
Figure 4:
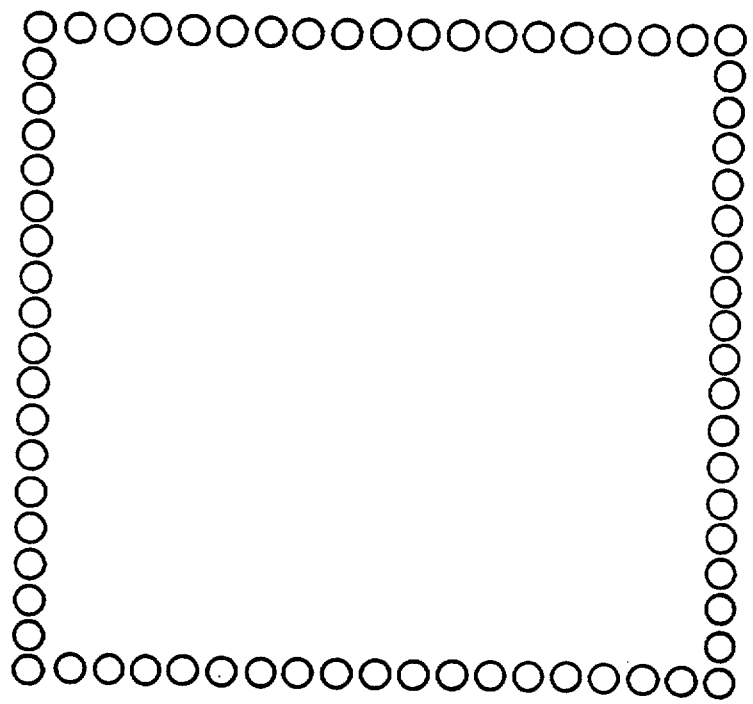
FIG. 4 is a illustration of an example of the CAD data for determining the positions of the fuel rods.

FIG. 1 is a block diagram of the essential components in an embodiment of the present invention, and FIG. 2 shows an example of an apparatus for measuring the positions of fuel rods disposed in the peripheries of the fuel assembly. In these drawings, the reference numeral 20 refers to a reflection type laser displacement meter disposed on the four peripheries of the fuel assembly so as to enable the displacement meter 20 to move in a plane perpendicular to the axis of the fuel rod 5 and along each of the peripheries of the fuel assembly. These reflection type laser displacement meters 20 are referred to as the peripheral fuel rods position determination means. The reflection type laser displacement meter 20 is engaged with a ball screw axle 22 of a probe operating device (operating means) 21, and is supported and guided by a guide mechanism. The ball screw axle 22 is driven in the forward and reverse directions about the axle 22 by means of a motor (driving device) 23 which is regulated by the control signals from the control device 40. This construction enables the displacement meter 20 to be moved along the ball screw axle 22 for any specific distance in accordance with the control signals from the control device 40.

Figure 5:
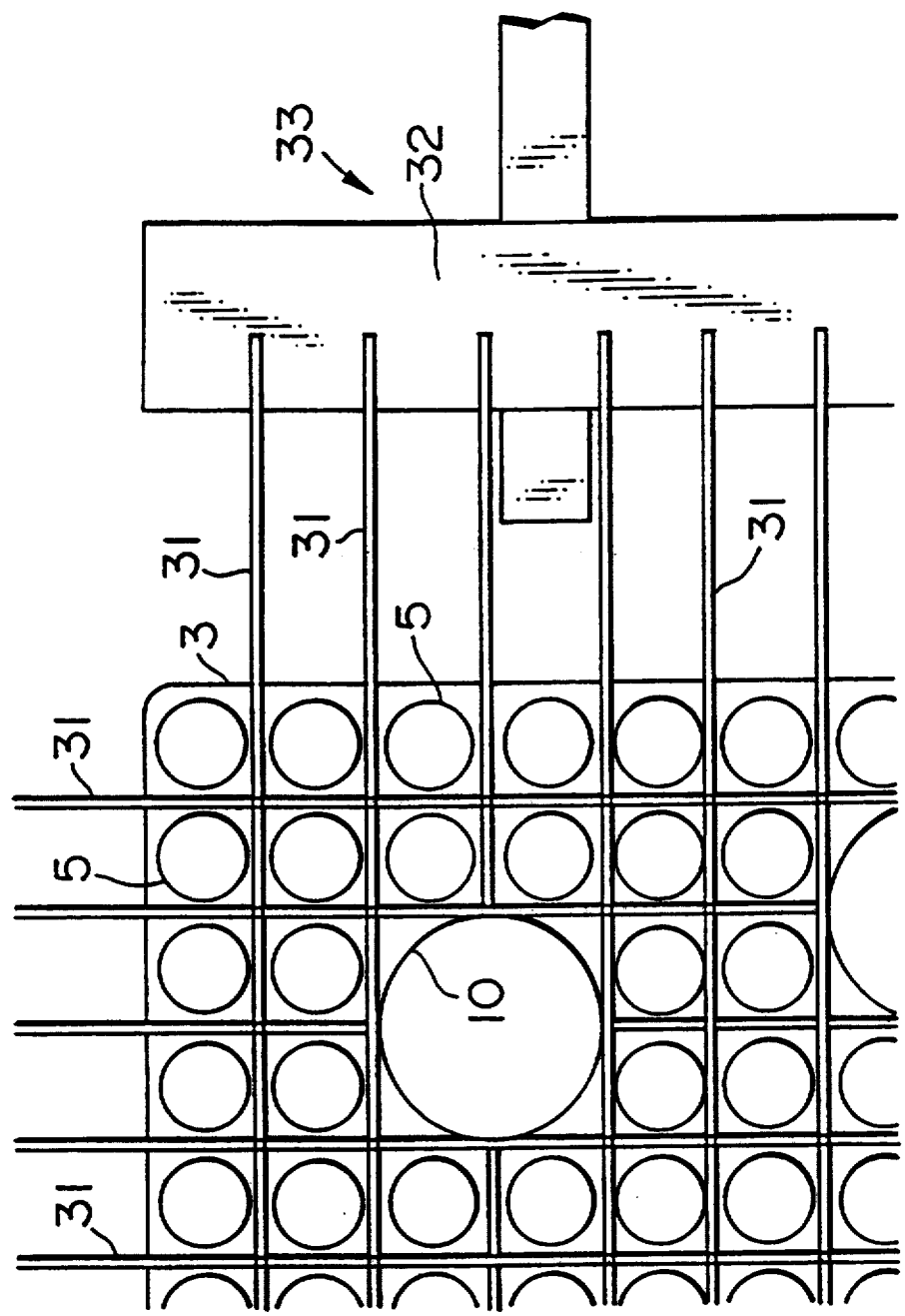
FIG. 5 is a schematic plan view of an example of the apparatus for measuring the profiles of the fuel rods in a fuel assembly.
Figure 6:
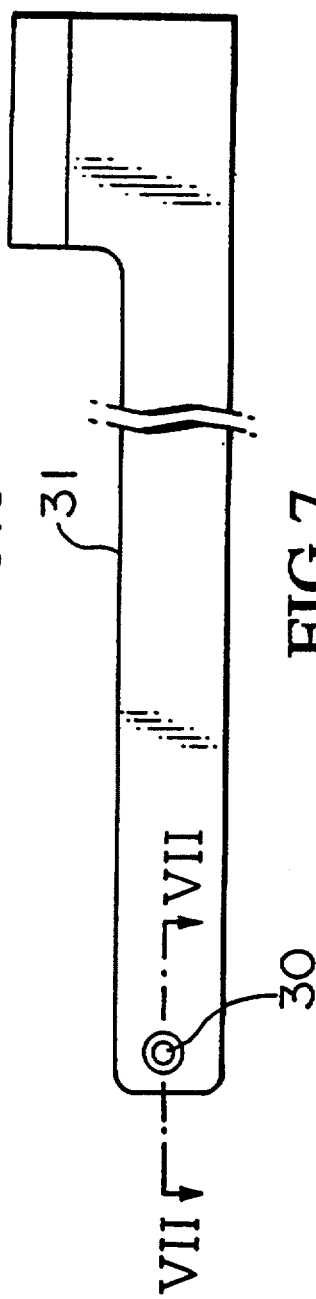
FIG. 6 is a partial side view of an example of the probe and the profile measuring sensor.
Figure 7:
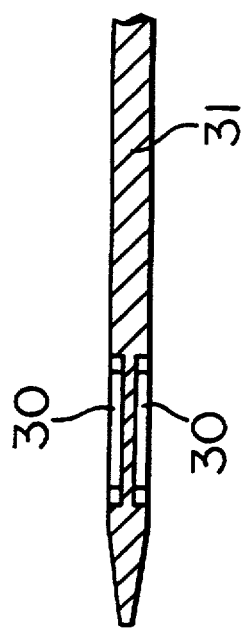
FIG. 7 is a cross sectional view of the tip of the probe taken along the line VII—VII in FIG. 6.

FIGS. 5 to 7 show an example of the device for measuring the profiles of the fuel rods 5 of the fuel assembly. The reference numeral 30 refers to a capacitance type sensor (interior fuel rod position determination means) mounted at the tip end of the probe 31 shown in FIG. 6. This sensor 30 is attached to both sides of the leading tip of each of the plate shaped-probe 31, as shown in FIG. 7, which also shows that the leading tip of the probe 31 is sharply formed towards the tip end. The base end of the probe 31 is attached to the probe support member 32 of a probe drive mechanism (probe driving means) 33, as shown in FIG. 5. The probe support member 32 is disposed so as to be movable towards and away from the four peripheries of the fuel assembly (i.e., the four side surfaces of the fuel assembly as viewed in its cross section). The construction of the probe drive mechanism 33 enables the probes 31 to be inserted into the spaces between the fuel rods 5 from the outside of the fuel assembly. This orientation of the probes 31 is such that the sensors 30 are disposed opposite to the peripheries of the fuel assembly. The plurality of the probes 31 disposed on the probe drive mechanism 33 have different lengths depending on the location of insertion of the probe 31 into the interior of the fuel assembly. This is explained further with reference to FIG. 5. If there happens to be a guide pipe 10 present in the path of a probe 31, the length of this probe 31 is made short so as to reach a distance Just short of the guide pipe 10. If there is no guide pipe 10 acting as an obstacle, then the length of the probe 31 is made long so that the probe 31 can be inserted past the number of fuel rods 5 into the interior of the fuel assembly. When the probe 31 is located in a place so that it is able to pass through all the fuel rods 5 in the interior of the fuel assembly, it is permissible to provide the probes 31 only on one of the opposing probe support members 32. In other words, the other probe support member 32 does not need to have the probes 31 so as to avoid the interference between the opposing probes. The sensors 30 are operated by the probe drive mechanism 33 regulated by the control device 40. The sensors 30 measure the profiles of the fuel rods 5 which are disposed on both sides of the probe 31 as they travel into the interior of the fuel assembly, and transmit the measured data successively to the control device 40 as they pass by each of the fuel rods 5.

Next, a method of measuring the positions of the fuel rods with the use of the position measuring apparatus of the above construction will be presented with reference to FIG. 2. First, the motor 23 of the probe operating device 21 is operated to obtain positional data for each fuel rod 5 while moving the reflection type laser displacement meter 20 along each of the peripheries of the fuel assembly. The measured data (refer to FIG. 3) are transmitted to the control device 40. Based on the measured data together with the pre-inputted data on the diameter of the fuel rod 5, the control device 40 determines the positions of each of the peripheral fuel rods 5 disposed along the four peripheries of the assembly, and prepares a CAD (computer assisted drafting) data for storage therein.

Figure 8:
FIG. 8 is an illustration of an example of the output data from the sensor disposed on one side region of the probe.
Figure 9:
FIG. 9 is an illustration of an example of the output data from the sensor disposed on the other side region of the probe.
Figure 10:
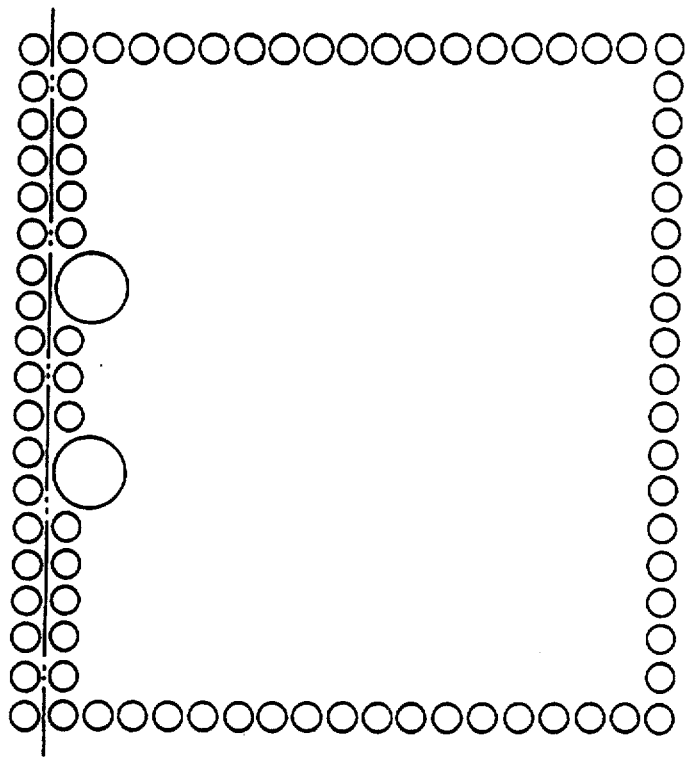
FIG. 10 is an example of the position determination data for the fuel rods in the interior of the fuel assembly.

Next, as shown in FIG. 5, the probe support member 32 of the probe drive mechanism 33 is moved close to the fuel rods 5 disposed at the four peripheries of the fuel assembly, and the sensors 30 are inserted into the spaces between the fuel rods 5 so as to measure the profiles of the fuel rods 5 disposed on both sides of the probe 31. The insertion is continued to the maximum distance allowable. At each position of measurement, the profile data obtained by the sensor 30, such as those shown in FIGS. 8 and 9, are transmitted to the control device 40. Based on the measured profile data obtained by the sensors 30 together with the CAD data and the diameter of the fuel rod 5, the control device 40 determines the positions of each of the fuel rods 5, successively from the peripheral fuel rods 5 disposed in the peripheries of the fuel assembly. An example of this determination process is shown in FIG. 10. In other words, using the reference positional data of the peripheral fuel rods 5 (i.e., stored CAD data), the positions of the interior fuel rods 5 are deduced on the basis of the profile data and the pre-inputted diameter of the fuel rods 5. When the determination of the positions of all the fuel rods 5 is thus completed, the distances between the fuel rods 5 are computed.

In the above described method, one profile data is sufficient to determine the positions of the interior fuel rods 5. However, to minimize the errors in the inter-rod distance measurements, it is preferable to measure the profile at several locations around a fuel rod 5.

As described above, even if it is impossible to insert the conventional strain gauge type probe into the fuel assembly to measure the distances between the interior fuel rods 5, because of the presence of the guide pipes 10, the method and the apparatus in the above embodiment enable a person to smoothly and accurately carry out the measurement of the distances between the interior fuel rods 5. The apparatus enables the determination of not only the inter-rod distances, but also the inter-rod positional relationships.

Figure 11:
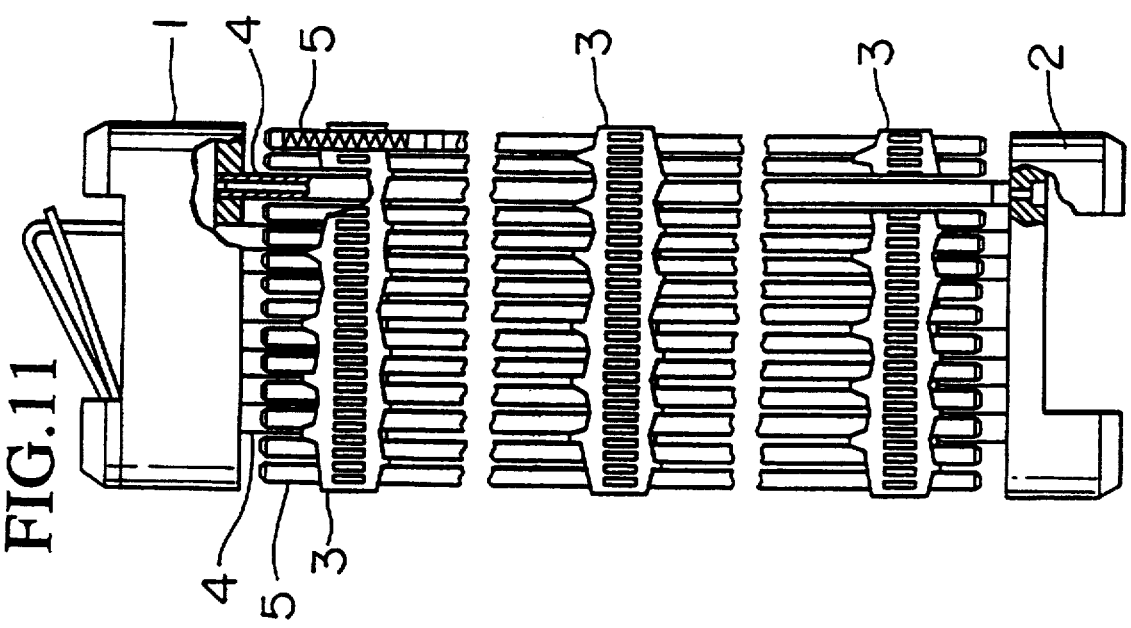
FIG. 11 is a schematic side view of a conventional fuel assembly.

Furthermore in the above embodiment, the fuel assembly with large diameter guide pipes 10 were used as an example. However, the method and the apparatus are also applicable to the conventional type of assembly such as the one shown in FIG. 11.

The present invention is not limited by the embodiment presented, and it is clear that many modifications of the apparatus are possible within the basic concept of the apparatus disclosed herein.

What is claimed is:

1. A method for measuring the positions of fuel rods housed in a fuel assembly comprising: an upper nozzle; a lower nozzle; a plurality of support grids, having grid cells defined by intersecting strips, disposed at a predetermined interval between said upper nozzle and said lower nozzle; a plurality of guide pipes inserted into said grid cells and attached to said support grids, to said upper nozzle and to said lower nozzle; and a plurality of fuel rods including peripheral and interior fuel rods inserted into said grid cells; said method comprising the steps of:

(a) determining positions of the peripheral fuel rods disposed on peripheries of said fuel assembly from outside of said fuel assembly;

(b) inserting sensors into the spaces between the interior fuel rods so as to measure the profiles of the interior fuel rods;

(c) computing the positions of each of said plurality of fuel rods on the basis of the profiles of the interior fuel rods measured, the positions of the peripheral fuel rods and a diameter of the fuel rods.

2. An apparatus for measuring the positions of fuel rods housed in a fuel assembly comprising: an upper nozzle; a lower nozzle; a plurality of support grids, having grid cells defined by intersecting strips, disposed at a predetermined interval between said upper nozzle and said lower nozzle; a plurality of guide pipes inserted into said grid cells and attached to said support grids, to said upper nozzle and to said lower nozzle; and a plurality of fuel rods having a diameter inserted into said grid cells; said apparatus comprising:

(a) peripheral fuel rods position determination means disposed so as to be movable along the peripheries of said fuel assembly and in a plane perpendicular to the axis of the fuel rods for determining the positions of the peripheral fuel rods disposed on the peripheries of said fuel assembly;

(b) operating means disposed on said peripheral fuel rod position determination means for moving the peripheral fuel rod position determination means;

(c) interior fuel rod position determination means disposed so as to enable insertion and removal between the interior fuel rods for determining the positions of the interior fuel rods disposed in the interior of said fuel assembly with reference to the positions of the peripheral fuel rods;

(d) interior fuel rod position determination driving means for driving said interior fuel rod position determination means; and (e) a controller for computing positions of each of the fuel rods based on the determined positions of the peripheral fuel rods and the interior fuel rods.

3. An apparatus as claimed in claim 2, wherein said probe operating means comprises a ball screw axle engaged with said peripheral fuel rod position determination means and driving device for moving said ball screw axle in the forward and reverse directions.

4. An apparatus as claimed in claim 2, wherein said interior fuel rod position determination means comprises a probe for insertion into the spaces between the fuel rods and a capacitance type sensor supported on the probe for insertion into the spaces between the fuel rods.

5. An apparatus as claimed in claim 2, wherein said fuel assembly is rectangular shaped, viewed in a cross section at right angles to the axis of the fuel rods, is provided with four side surfaces, and said interior fuel rod position determination means is provided opposite to at least two side surfaces, and comprises probes which are insertable into the interior of said fuel assembly, and a sensor supported on each of said probes.

6. An apparatus as claimed in claim 5, wherein said sensor is a capacitance type sensor.

7. An apparatus for measuring the positions of fuel rods housed in a fuel assembly comprising: an upper nozzle; a lower nozzle; a plurality of support grids, having grid cells defined by intersecting strips, disposed at a predetermined interval between said upper nozzle and said lower nozzle; a plurality of guide pipes inserted into said grid cells and attached to said support grids, to said upper nozzle and to said lower nozzle; and a plurality of fuel rods having a diameter inserted into said grid cells; said apparatus comprising:

(a) peripheral fuel rods position determination means disposed so as to be movable along the peripheries of said fuel assembly and in a plane perpendicular to the axis of the fuel rods for determining the positions of the peripheral fuel rods disposed on the peripheries of said fuel assembly, wherein said peripheral fuel rod position determination means comprises a reflection type laser displacement meter;

(b) operating means disposed on said peripheral fuel rod position determination means for moving the peripheral fuel rod position determination means;

(c) interior fuel rod position determination means disposed so as to enable insertion and removal between the interior fuel rods for determining the positions of the interior fuel rods disposed in the interior of said fuel assembly with reference to the positions of the peripheral fuel rods;

(d) interior fuel rod position determination driving means for driving said interior fuel rod position determination means.

8. An apparatus as claimed in claim 7, wherein said operating means comprises a ball screw axle engaged with said peripheral fuel rod position determination means and driving device for moving said ball screw axle in the forward and reverse directions.

9. An apparatus as claimed in claim 7, wherein said interior fuel rod position determination means comprises a probe for insertion into the spaces between the interior fuel rods and a capacitance type sensor supported on the probe for insertion into the spaces between the interior fuel rods.

10. An apparatus as claimed in claim 7, wherein said fuel assembly is rectangular shaped, viewed in a cross section at right angles to the axis of the fuel rods, and is provided with four side surfaces, and said peripheral fuel rod position determination means is disposed opposite to each of said four side surfaces.

11. An apparatus as claimed in claim 7, wherein said fuel assembly is rectangular shaped, viewed in a cross section at right angles to the axis of the fuel rods, and is provided with four side surfaces, and said interior fuel rod position determination means is provided opposite to at least two side surfaces, and comprises probes which are insertable into the interior of said fuel assembly, and a sensor supported on each of said probes.

12. An apparatus as claimed in claim 11, wherein said sensor is a capacitance type sensor.

13. An apparatus for measuring the positions of fuel rods housed in a fuel assembly comprising: an upper nozzle; a lower nozzle; a plurality of support grids, having grid cells defined by intersecting strips, disposed at a predetermined interval between said upper nozzle and said lower nozzle; a plurality of guide pipes inserted into said grid cells and attached to said support grids, to said upper nozzle and to said lower nozzle; and a plurality of fuel rods having a diameter inserted into said grid cells; said apparatus comprising:

(a) peripheral fuel rods position determination means disposed so as to be movable along the peripheries of said fuel assembly and in a plane perpendicular to the axis of the fuel rods for determining the positions of the peripheral fuel rods disposed on the peripheries of said fuel assembly;

(b) operating means disposed on said peripheral fuel rod position determination means for moving the peripheral fuel rod position determination means;

(c) interior fuel rod position determination means disposed so as to enable insertion and removal between the interior fuel rods for determining the positions of the interior fuel rods disposed in the interior of said fuel assembly with reference to the positions of the peripheral fuel rods;

(d) interior fuel rod position determination driving means for driving said interior fuel rod position determination means; and wherein said fuel assembly is rectangular shaped, viewed in a cross section at right angles to the axis of the fuel rods, and is provided with four side surfaces, and said peripheral fuel rod position determination means is disposed opposite each of said four side surfaces.

14. An apparatus as claimed in claim 13, wherein said peripheral fuel rod position determination means comprises a reflection type laser displacement meter.

15. An apparatus as claimed in claim 13, wherein said operating means comprises a ball screw axle engaged with said peripheral fuel rod position determination means and driving device for moving said ball screw axle in the forward and reverse directions.

16. An apparatus as claimed in claim 13, wherein said interior fuel rod position determination means comprises a probe for insertion into the spaces between the interior fuel rods and a capacitance type sensor supported on the probe for insertion into the spaces between the interior fuel rods.

17. An apparatus as claimed in claim 13, wherein said interior fuel rod position driving means is provided opposite to at least two side surfaces, and comprises probes which are insertable into the interior of said fuel assembly, and a sensor supported on each of said probes.

18. An apparatus as claimed in claim 17, wherein said sensor is a capacitance type sensor.

19. A system for measuring the positions of fuel rods housed in a fuel assembly comprising: an upper nozzle; a lower nozzle; a plurality of support grids, having grid cells defined by intersecting strips, disposed at a predetermined interval between said upper nozzle and said lower nozzle; a plurality of guide pipes inserted into said grid cells and attached to said support grids, to said upper nozzle and to said lower nozzle; and a plurality of fuel rods including peripheral and interior fuel rods inserted into said grid cells; said system comprising:

(a) means for determining positions of the peripheral fuel rods disposed on peripheries of said fuel assembly from outside of said fuel assembly;

(b) means for inserting sensors into the spaces between the interior fuel rods so as to measure the profiles of the interior fuel rods;

(c) means for computing the positions of each of said plurality of fuel rods on the basis of the profiles of the interior fuel rods measured, the positions of the peripheral fuel rods and a diameter of the fuel rods.

* * * * *